Feb. 14, 1961  A. W. SIEVING  2,971,398
TRACTOR TRANSMISSION AND DIFFERENTIAL ASSEMBLY
Filed Dec. 22, 1958  2 Sheets-Sheet 1
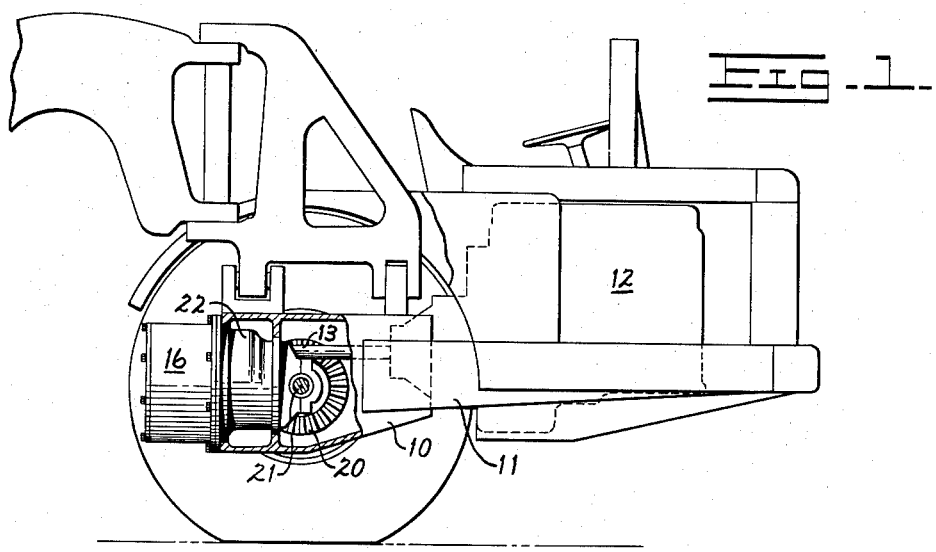
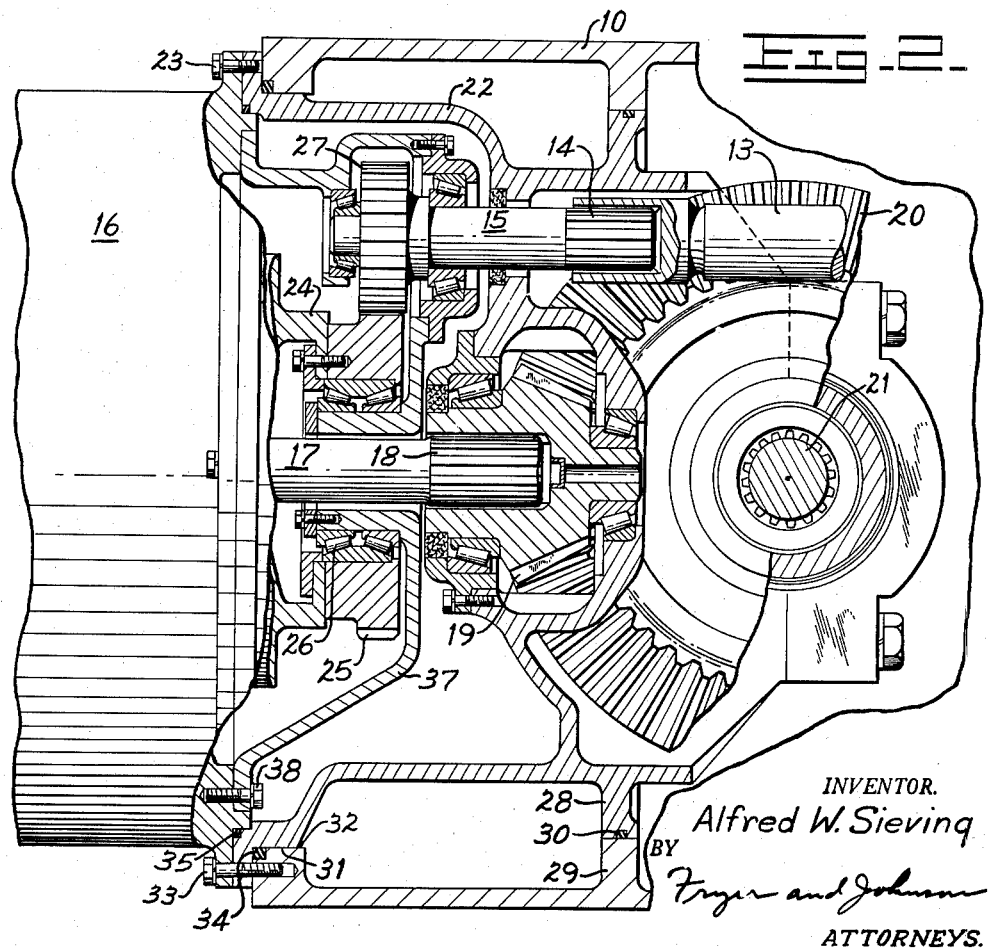
INVENTOR.
Alfred W. Sieving
BY
ATTORNEYS.

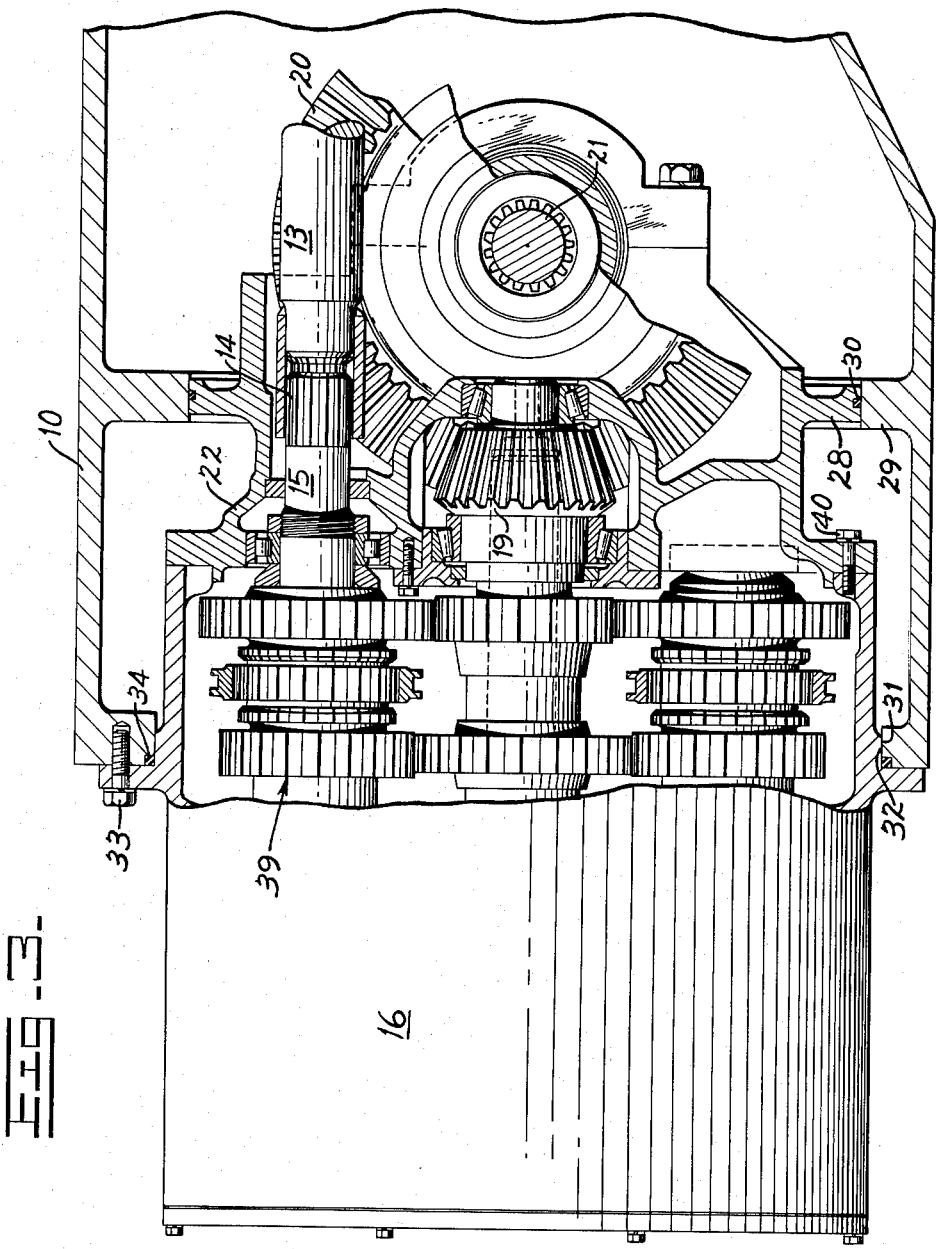

United States Patent Office 2,971,398
Patented Feb. 14, 1961

2,971,398
TRACTOR TRANSMISSION AND DIFFERENTIAL ASSEMBLY

Alfred W. Sieving, Decatur, Ill., assignor to Caterpillar Tractor Co., Peoria, Ill., a corporation of California Filed Dec. 22, 1958, Ser. No. 782,245

5 Claims. (Cl. 74—606)

This invention relates to the transmission and differential assembly in tractors of the kind in which the driving axle is disposed closely adjacent the engine within a main tractor housing and the transmission is disposed rearwardly or at the end of the main housing opposite to the engine whereby the power train leads from the engine through the housing to the transmission and then back toward the differential associated with the drive axle.

It is an object of the invention to provide a rigid and perfectly aligned assembly of a transmission and differential with a main housing and to provide separate transmissions and differential housing containing their respective mechanisms which may be secured together as a single unit capable of being accurately and securely positioned with respect to the main housing with all related operating parts preadjusted to precise working positions.

The invention is described herein in its application to a specific type of two-wheel tractor but it is not limited to such application because it is adaptable to other machines having drive axles close to the engine so that it is necessary to place the transmission on the opposite side of the axle.

A preferred form of the invention and a modification thereof are shown in the accompanying drawings and described in detail in the following specification wherein further of its objects and advantages are made apparent.

In the drawings:

Fig. 1 is a schematic view in side elevation of a two wheel tractor with a transmission and differential assembly embodying the present invention, the tractor main housing being shown partially in section;

Fig. 2 is an enlarged central vertical longitudinal section through a portion of the tractor main housing and portions of the transmission and differential housings, and;

Fig. 3 is a view similar to Fig. 2 illustrating a modification of the invention where a different type of transmission is employed.

In Fig. 1 of the drawings, a two wheel tractor of a conventional make is shown as having a main housing 10, which has a pair of frame members one of which is shown at 11 secured to and extending forwardly from it to support an engine indicated at 12. The drive shaft of the engine, shown at 13 is coupled as by a splined connection shown at 14 in Fig. 2 with an input shaft 15 of a transmission contained in a housing 16. The output shaft of the transmission shown at 17 in Fig. 2, has a splined connection 18 with a beveled pinion 19 meshing with a differential main ring gear 20 which drives a conventional differential not shown for imparting differential drive to a pair of stub axles which are part of a rear drive axle assembly and one of which is shown at 21.

A differential housing 22 carries a differential, as well as the pinion 19 and bevel gear 20, and is secured as by a circle of cap screws, one of which is shown at 23, to the transmission housing 16. The input of the transmission in this case is in the form of a planetary gear cage, a portion of which is shown at 24 carrying a gear 25 on suitable bearings 26 and meshing with a gear 27 on the transmission input shaft 15.

The differential housing 22 has a forwardly positioned annular flange 28 with its periphery machined to fit precisely within a circular opening in a wall 29 in the main tractor housing. A seal ring 30 may be employed at this connection. The differential housing also has a precisely machined annular surface 31 adjacent its rear end fitting an annular opening 32 in the rear wall of the tractor main housing. A circle of cap screws, one of which is illustrated at 33, extends through flanges on the transmission housing and the differential housing and are threaded into the rear face of the main tractor housing to hold the entire assembly in place. Sealing gaskets 34 and 35 may also be employed at this connection.

With the construction thus far described, removal of the stub axle shafts 21 which have splined connections, as shown, with the differential gearing enables the entire transmission and differential assembly to be withdrawn from the tractor as a unit by simply removing the cap screws 33 and it also enables the differential mechanism as well as the transmission to be fabricated as sub-assemblies connected together and inserted into the main housing of the tractor with a high degree of precision.

With the assembly shown in Fig. 2, an auxiliary housing 37 secured as by cap screws 38 to the forward end of the transmission housing 16 provides support for the forward transmission parts such as the input shaft 15 and its associated gearing so that upon removal of the cap screws 23 as well as the cap screws 33, the transmission may be removed without removing the differential and differential housing, the splines 14 and 18 being provided to enable ready separation of the transmission from the differential. This is, of course, an advantage when it is desired to service the transmission without servicing the differential and it obviates the necessity of disassembling the drive axle assembly and withdrawing the stub axle shafts 21.

Fig. 3 shows a modification of the invention designed for tractors employing a constant mesh gear type transmission rather than the planetary type transmission referred to in Fig. 2 and where space does not permit the utilization of the auxiliary housing shown at 37 in Fig. 2 so that it becomes necessary to remove both the transmission and differential as a unit when it is desired to service either. Identical reference characters are employed for the identification of corresponding parts in Figs. 2 and 3 though the shapes of the differential housing 22 and transmission housing 16 are seen to vary. In this figure, the input shaft 15 of the transmission imparts a drive to the constant mesh type gearing generally indicated at 39, a portion of which is shown but which is not described in detail because it does not constitute a part of the present invention. In the structure shown in Fig. 3, the differential housing 22 is connected by cap screws 40 with the inner end of the transmission housing which projects into the tractor housing and cannot be separated therefrom except upon removal of the cap screws 33 and withdrawal of both housings from their position in the main tractor housing after removal of the stub axles 21.

In both modifications of the invention, the transmission and differential are rigidly supported and accurately positioned by the provision of two machined annular surfaces which fit annular recesses in spaced walls of the main tractor housing. The cap screws 33 are relied upon only to hold them in place and not to maintain alignment of their operating parts with each other and with the engine drive shaft 13 and final drive assembly with which they are associated.

I claim:

1. In a tractor having a main housing containing a final drive assembly, a change speed transmission housing, a differential housing, means to secure said last two housings together as a unit, said main housing having spaced walls with openings therein, and said housing unit having parts machined to fit said openings whereby the housing unit is piloted into its proper position with respect to the main housing, said means to secure the transmission and differential housings together being exposed upon assembly of the three housings to permit removal of the transmission housing alone.

2. In a tractor having a main housing containing a final drive assembly, a change speed transmission housing, a differential housing, means to secure said last two housings together as a unit, said main housing having spaced walls with openings therein, and said housing unit having parts machined to fit said openings whereby the housing unit is piloted into its proper position with respect to the main housing, and means to secure the housing unit in said position, said means to secure the transmission and differential housings together being exposed upon assembly of the three housings to permit removal of the transmission housing alone.

3. In a tractor of the kind having an engine, a main housing including driving gear behind the engine, a transmission housing behind the main housing, and a differential and housing therefor between the transmission and the driving gear, means to secure the differential housing to the transmission housing to form an assembled unit, means to secure said unit to the main housing, and both of said means to secure being exposed for removal when the housings are assembled to permit removal of the transmission housing while the differential housing remains in place.

4. In a tractor of the kind having an engine, a main housing including driving gear behind the engine, a transmission housing behind the main housing, and a differential and housing therefor between the transmission and the driving gear, means to secure the differential housing to the transmission housing to form an assembled unit, and means to secure said unit to the main housing with all said securing means accessible for releasing the transmission housing to be removed while the differential housing remains in place.

5. In a tractor of the kind having an engine, a main housing including driving gear behind the engine, a transmission housing behind the main housing, and a differential and housing therefor between the transmission and the driving gear, means to secure the differential housing to the transmission housing to form an assembled unit comprising cap screws extending through mating flanges in the differential and transmission housings, and means to secure said unit to the main housing comprising cap screws extending through said mating flanges and into the main housing, said main housing having spaced walls with openings therein, and said assembled unit having peripheral parts fitting said openings to accurately position the assembled unit with respect to the main housing and driving gear therein.

References Cited in the file of this patent

UNITED STATES PATENTS

| 1,938,201 | Wells | Dec. 5, 1933 |
| 2,249,035 | Peterson et al. | July 15, 1941 |

FOREIGN PATENTS

| 306,997 | Great Britain | Mar. 1, 1929 |